United States Patent [19]
Schaefer, Jr. et al.

[11] 3,821,498
[45] June 28, 1974

[54] CONTROL PENDANTS

[75] Inventors: Hans F. Schaefer, Jr., Rockport; David W. France, West Newbury, both of Mass.

[73] Assignee: USM Corporation, Boston, Mass.

[22] Filed: May 30, 1972

[21] Appl. No.: 257,836

[52] U.S. Cl. ............... 200/18, 200/6 A, 214/1 CM
[51] Int. Cl. ...... B25j 3/00, B25j 13/02, H01h 21/12
[58] Field of Search .............. 74/479, 471 XY, 471; 214/1 CM; 200/6 A, 18; 33/1 M

[56] References Cited
UNITED STATES PATENTS

| | | | |
|---|---|---|---|
| 3,133,649 | 5/1964 | Serrell | 214/1 CM |
| 3,241,243 | 3/1966 | Speer | 33/1 M X |
| 3,350,956 | 11/1967 | Monge | 74/471 XY |
| 3,573,412 | 4/1971 | Uhrich | 200/6 A X |
| 3,600,967 | 8/1971 | Auguin | 74/479 |
| 3,723,687 | 3/1973 | Adkinson | 200/6 A X |

FOREIGN PATENTS OR APPLICATIONS
1,045,799  10/1966  Great Britain ................. 214/1 CM Primary Examiner—Allan D. Herrmann
Attorney, Agent, or Firm—Ralph D. Gelling; Vincent A. White; Richard B. Megley

[57] ABSTRACT

A control for a device having members movable along a plurality of axes has elements movable along axes corresponding to each axis of movement of the members of the device and means operatively connected to each control element for controlling means for moving members of the device along each corresponding axis of the device. The axes of movement are both linear and rotational.

1 Claim, 4 Drawing Figures

CONTROL PENDANTS

BACKGROUND OF THE INVENTION

Modern mechanical devices frequently require controls for guiding movement of members of the device. Such controls are particularly useful where it is desired to isolate an operator from the controlled device as where a manipulator is to operate on radioactive or thermally hot articles. Such controls are also useful to consolidate control of several widely spaced movements in the hands of one operator, such as in the control of an airplane. A familiar type of manipulator control is the master hand movable exactly as a controlled hand and a familiar type of airplane control is the upstanding lever or joy stick movable along two axes of movement for causing movement of the airplane along a corresponding two axes of movement. Since in each type control, movement of the control and controlled device correspond both in direction and degree, the operator or pilot can intuitively react to quickly achieve the desired control without thinking about the controls.

The intuitive control which results from the corresponding movements of a control and a device to be controlled is not only useful for quick control as with the airplane but additionally useful where the operator has only minimum training for controlling the device. Without much training, operators quickly acquire skills at controlling a device when the control may be moved on axes corresponding to desired movement of the device.

Unfortunately, controls of this type have been limited by the number of axes of movement which may be controlled and by the high cost of the complex switches usually needed to convert the complex movements of the control into useful signals for directing the means for moving the device to be controlled. Further, joy sticks known for controlling axes of linear movement of a device actually move rotationally about a base pivot of the stick and thus do not correspond to the linear movement on the device. Some devices have more axes of movement or linear axes and thus cannot be controlled with this type of stick control. One device with more than three independent axes of linear movement or more than one rotational axis of movement could be a known industrial manipulator having a hand member for grasping a part and a wrist for moving the hand having rotation about a longitudinal axis of the wrist and about a transverse axis of the wrist. The joy stick type control does not provide means for controlling these two rotational axes. Of course, combinations of multiple joy stick type controls provide control of additional axes of movement but destroy intuitive control by introducing operator uncertainty as to the appropriate stick to activate.

SUMMARY OF THE INVENTION

Accordingly, it is an object of the invention to provide a control for a device having movable members wherein elements of the control may be moved in axes corresponding to the desired movement of the members of the device. The control is particularly useful for controlling the movement of the members when there are more than three axes of independent linear movement or more than one rotational axis of movement for the members.

To this end the invention provides a control having elements movable along axes of movement corresponding to axes of movement of members of a device to be controlled. Means are operatively connected with each movable element of the control for controlling means for moving members of the device along axes corresponding to the movement of a control element. Preferably, the control is used for an industrial manipulating device and portable in an operator's hand.

DESCRIPTION OF THE DRAWINGS

A preferred embodiment of the invention which is intended to be illustrative of and not a limitation on the invention will now be described with reference to the drawings, in which.

DESCRIPTION OF THE PREFERRED EMBODIMENT

Figure 1:
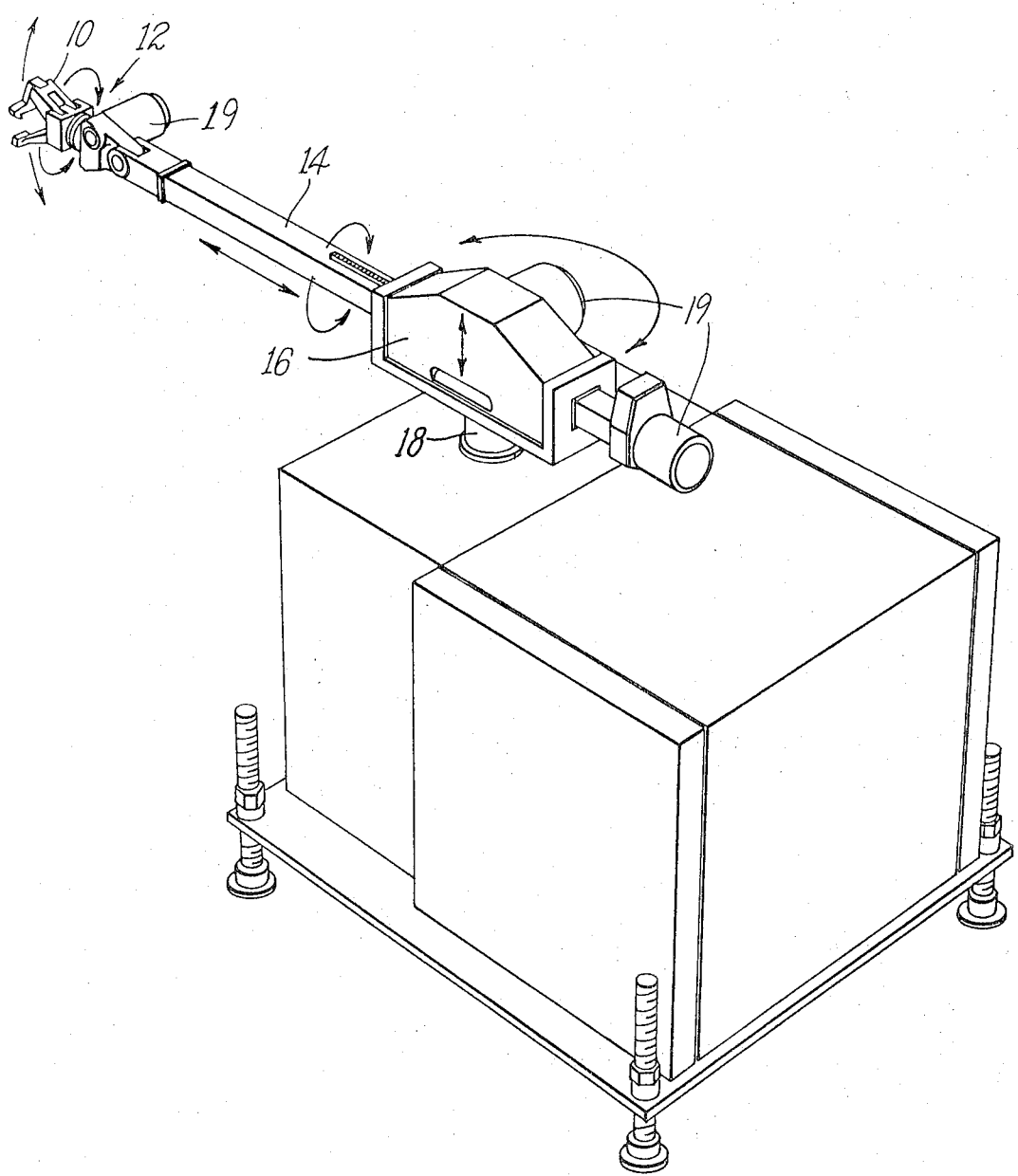
FIG. 1 is a perspective view of a manipulating device.

FIG. 1 shows a manipulating device having a grasping member 10 which may be opened and closed for seizing articles. The grasping member is mounted on a wrist member 12 for rotation about a longitudinal axis of an arm member 14 on which the wrist is mounted and for rotation about an axis normal to the longitudinal axis of the arm. Each movement is indicated by arrows adjacent the wrist 12. The arm 14 is mounted in a support member 16 for movement along its longitudinal axis and for movement of rotation about its longitudinal axis. Each arm movement is indicated by arrows adjacent the arm 14. The support 16 is mounted on a column member 18 for movement along a longitudinal axis of the column and for rotation about the longitudinal axis of the column. Each support movement is indicated by arrows adjacent the support 16. The members of the device are thus movable relative to two axes of linear movement and four axes of rotational movement. Means, such as electric motors 19 (only three being shown), are provided for moving members of the device along each axis of movement.

Figure 2:
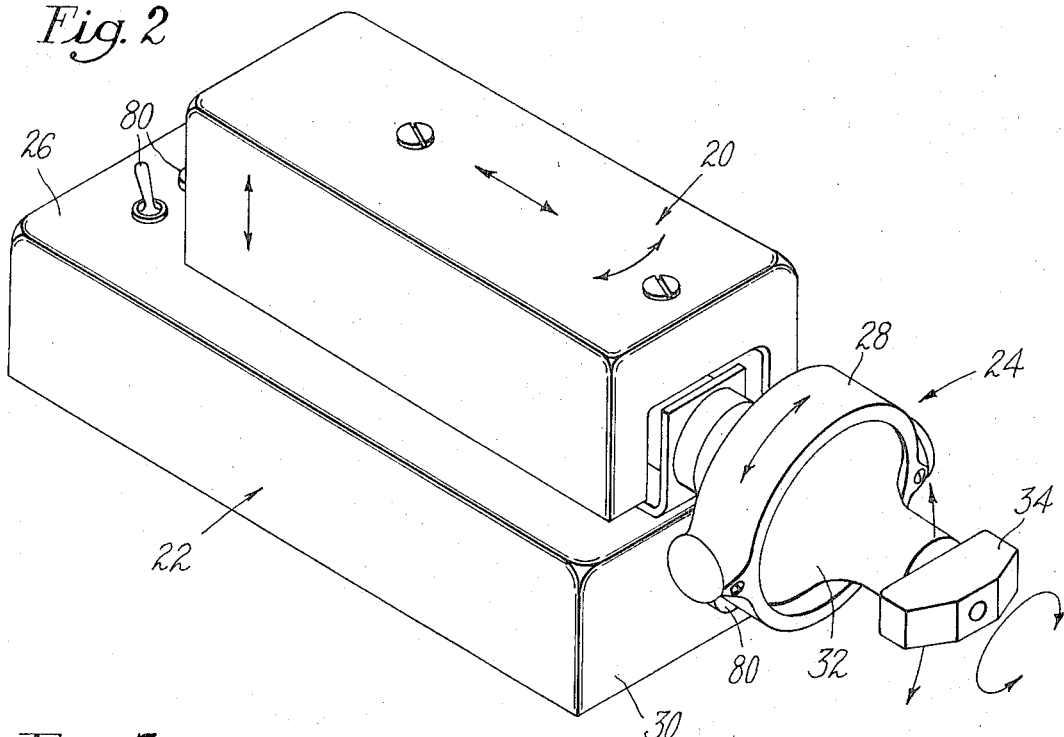
FIG. 2 is a perspective view of a control embodying the invention.

To control the means for moving the various members of the above described manipulating device relative to their axes, a control shown in FIG. 2 is provided. The control has a turret element 20 mounted on a base 22 having a projection 24. Both the turret 20 and projection 24 are mounted for movement along axes of movement relative to the base 22 which, together, correspond to all the axes of movement of the device. The turret 20 is mounted for movement relative to a top surface 26 of the base along axes extending normally to the surface 26, parallel to the surface and rotationally within a plane parallel to the surface. These movements correspond with the axes of movement of the support 16 and arm 14 members of the device except for the rotation of the arm relative to the support. The projection 24 has a ring element 28 rotatable within a plane parallel to an end surface 30 of the base which extends normally to the top surface 26. The projection also has a bell element 32 rotatable with respect to the ring element 28 on an axis parallel to the surfaces 26 and 30 and a knob element 34 on the bell element rotatable with respect to an axis extending normally to the axis of rotation of the bell. The axes of movement of the elements of the projection 24 correspond to the axes of movement of the wrist element 12 and the rotational axis of the arm 14 of the manipulating device.

Figure 3:
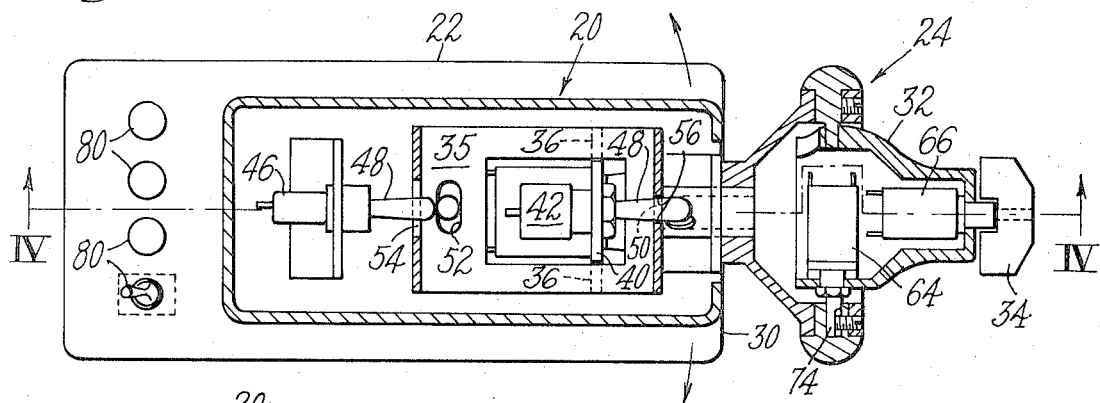
FIG. 3 is a plan view partly in section of a portion of the control shown in FIG. 2.
Figure 4:
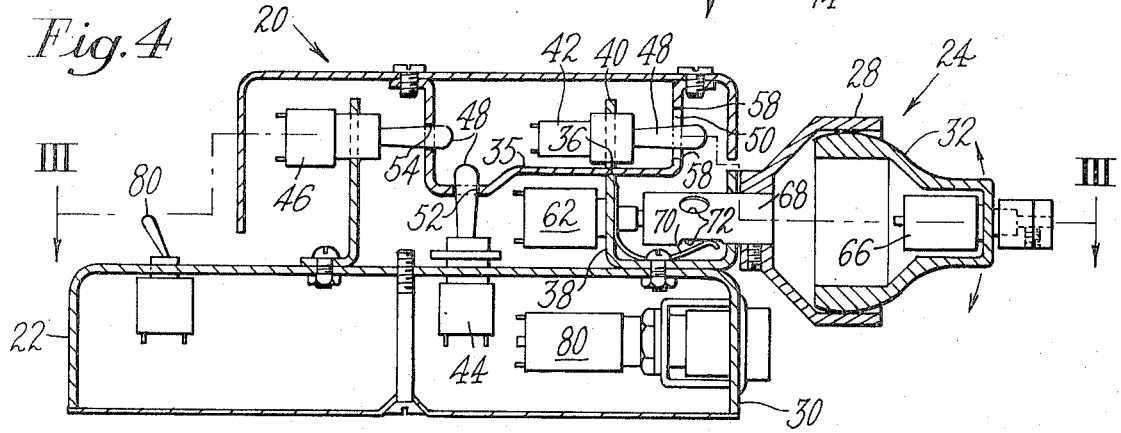
FIG. 4 is another section view in elevation of a portion of the control.

As seen in FIGS. 3 and 4, a support portion 35 of the turret 20 is restingly supported on shoulders 36 of a support member 38 secured to the base 22 of the control for sliding, pivotal movement relative to the base. A tang 40 of the support member 38 extends through an aperture in the turret portion 35 to fixedly support a switch 42. A second switch 44 is fixedly mounted directly to the base while a third switch 46 is fixedly mounted to a projection from the base. Switch levers 48 extend from each of the switches 42, 44, and 46 through apertures 50, 52, and 54, respectively, in the support portion 35 of the turret.

Each of the apertures 50, 52 and 54 is shaped to have edges closely engaged with the switch levers 48 on minor axes of the apertures and edges spaced from the switch levers on major axes of the apertures. The minor axis of each aperature is arranged parallel to one of the axes of movement of the turret so that movement of the turret on one of its axes will move the switch lever of one and only one of the switches 42, 44 and 46. Each of the switches is a double throw type switch so that movement of its switch lever in either direction along the axis of movement of the turret will cause the switch to close a switch pole (not shown) associated with that direction of movement.

Since it will be appreciated that the operation of each of the switches 42, 44 and 46 is substantially the same, only the operation of switch 42 will be described in particular detail. As seen in FIG. 3, edges 56 along the minor axis of aperture 50 parallel to the surface 26 closely engage the lever of switch 42 for moving the lever. On the other hand, as seen in FIG. 4, edges 58 of the aperture 50 on the major axis of the aperture extending normally to the surface 26 are spaced from the lever of switch 42 so as not to engage or move the switch lever when the turret is moved. Pivotal movement of the turret on the shoulders 36 of the turret support, as indicated by the arrows, will cause the edges 56 of the aperture 50 to engage and move the lever of switch 42 while movement normal to the surface 26 will not move the switch lever. Similarly, movement of the turrt in a direction parallel to the surface 26 and turret to the surface 30 will not move the lever of switch 42 because the lever freely slides through the aperture 56. Thus, only rotation of the turret will throw switch 42 which is appropriately connected (not shown) to means (not shown) for rotating the arm support member of the manipulator about the axis of column 18.

In a similar manner, it will be appreciated that switch 44 is responsive only to linear movement of the turret on an axis parallel to the surface 26 and normal to the surface 30. Switch 44 is appropriately coupled to means for linearly moving the arm member 14 of the device. And, again in similar fashion, movement of the turret normally to the surface 26 and substantially parallel to the surface 30 will throw the lever of switch 46 for appropriately controlling vertical linear movement of the support member 16 of the device. It should be noted that movement of the turret normally to the surface 26 is actually pivotal movement about the shoulders 36 of the support portion of the base. However, the switch 46 is spaced sufficiently far from the pivot relative to the length of the arc of turret movement that turret movement along the arc at the lever of switch 46 is substantially linear in a direction substantially normal to the surface 26 and parallel to the surface 30 and thus substantially analogous to the vertical linear movement of the arm support member 16 of the device.

In an alternative embodiment, the aperture 54 may be reduced to closely engage the lever of switch 46 on all sides. The switch lever is constrained to move along one axis only by the structure (not shown) of switch 46. Switch 46 will thus be effective to control only one axis of movement while the turret is constrained to pivot about the switch lever with sliding support from the shoulders 36 of the support member. The operation of each switch 42, 44 and 46 is thus the same but the radius of rotational movement of the turret is increased by the distance between the support member 38 to the aperture 54. This alternative arrangement may provide a better intuitive "feel" for an operator of the control.

As further seen in FIGS. 3 and 4, the projection 24 is operatively connected to double throw rotary switches 62, 64 and 66. The switch 62 is mounted on the support member 38 with its rotatable, switch actuating projection secured to a sleeve 68. The sleeve 68 is rotatably mounted on a support portion of the base and secured to the ring 28 so that rotation of the ring actuates the switch 62. A spring 70 projects from the base and engages one of two detents 72 in the sleeve 68 for holding the ring in one of two positions determined by engagement of the spring and detents. The switch 62 is appropriately connected (not shown) to means (not shown) for rotating the arm 14 of the device which has a corresponding two rotatable positions about its longitudinal axis.

The bell element 32 is rotatably mounted in the ring 28 on a pair of diametrically opposed pins and sockets. One of the pins is formed by a rotatable, switch actuating projection 74 of the switch 64 so that rotation of the bell relative to the ring actuates the switch 64. This switch 64 is appropriately connected (not shown) to means for rotating the wrist 12 of the device about an axis normal to the longitudinal axis of the arm of the device.

Finally, switch 66 is mounted in the bell element 32 with a rotatable, switch actuating projection extending through the bell to connect to knob 34. Rotation of the knob 34 actuates switch 66 which is appropriately connected (not shown) to means for rotating the wrist 12 about the longitudinal axis of the arm of the device.

As described, the control pendant has rotary and linear axes of movements corresponding to all the rotary and linear axes of movement of the device and switches operatively connected between the elements of the control movable on their various axes and the means for moving the members of the device on their corresponding axes of movement. Specifically, the control is shown to have two axes of linear movement and four axes of rotary movement corresponding to similar axes of movement in the device. It is understood, of course, that other combinations of axes are contemplated to be within the scope of the invention. Appropriate combinations of rotary and linear switches operatively connected between an element of the control fixed relative to a desired axis of movement and another element of the control movable along the axis will permit the control described to be modified for other combinations of axes of movement.

Further means for controlling the device may also be consolidated on the control to achieve still further convenience for the operator as contemplated by the invention. For this purpose, additional switches 80 may be located at convenient points on the control. The switches may, for example, regulate the speed of operation of the device, provide an emergency stop means for the device or actuate various information recordal means associated with the device for recording a particular sequence of device operation. Because such control means are portable with the control, intuitive operation of the device by an operator is facilitated by locating these control means on the control.

Having thus described our invention, what we desire to secure by Letters Patent of the United States is:

1. In a manipulator having means for moving its members along or about a plurality of axes, a control for actuating said moving means comprising:
   A. A supporting base;
   B. A turret mounted on the supporting base for sliding movement along a first axis and for rotating movement about a second axis perpendicular to said first axis;
   C. A ring element mounted on the supporting base for rotation about an axis parallel to the first axis of the turret;
   D. A bell element mounted on the ring for pivotal movement about an axis perpendicular to the axis of said ring element;
   E. A knob element mounted on the bell element for rotation about an axis perpendicular to the axis of said bell element;
   F. Switching means operatively connected to each of the turret, ring, bell and knob elements for actuation during movement along or about each of the axes of said elements, said switching means, in turn, actuating the respective moving means which cause movement of the manipulator members about axes corresponding to the respective axes of said elements.

* * * * *